(12) United States Patent
Chang

(10) Patent No.: US 7,958,405 B1
(45) Date of Patent: Jun. 7, 2011

(54) AUTOMATIC TESTING SYSTEM AND METHOD FOR JUDGING WHETHER UNIVERSAL SERIAL BUS DEVICE IS CONFIGURED TO COMPUTER

(75) Inventor: Pei-Ming Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 11 days.

(21) Appl. No.: 12/699,422

(22) Filed: Feb. 3, 2010

(30) Foreign Application Priority Data

Nov. 20, 2009 (TW) .............................. 98139437 A

(51) Int. Cl.
*G06F 11/00* (2006.01)
(52) U.S. Cl. ............... 714/44; 714/5.1; 714/30; 714/56; 710/8; 710/10; 710/15; 710/105
(58) Field of Classification Search ............ 710/8, 10, 710/15, 105; 714/5.1, 30, 44, 56
See application file for complete search history.

(56) References Cited

U.S. PATENT DOCUMENTS

| | | | |
|---|---|---|---|
| 6,804,727 B1* | 10/2004 | Rademacher | 710/9 |
| 7,702,984 B1* | 4/2010 | Lee et al. | 714/742 |
| 7,788,553 B2* | 8/2010 | Chow et al. | 714/718 |
| 7,797,398 B2* | 9/2010 | Oishi et al. | 709/217 |
| 7,865,773 B2* | 1/2011 | Thornley et al. | 714/30 |
| 2003/0051192 A1* | 3/2003 | Pillay et al. | 714/39 |
| 2003/0056036 A1* | 3/2003 | Carlton | 710/15 |
| 2007/0299650 A1* | 12/2007 | Tamayo et al. | 703/27 |
| 2009/0055560 A1* | 2/2009 | Kanai | 710/63 |

* cited by examiner

*Primary Examiner* — Robert W Beausoliel, Jr.
*Assistant Examiner* — Charles Ehne
(74) *Attorney, Agent, or Firm* — Kirton & McConkie; Evan R. Witt

(57) ABSTRACT

An automatic testing system and method for judging whether a universal serial bus device is configured to a computer are provided. The automatic testing system includes a computer and a testing device for testing the universal serial bus device. By judging whether the universal serial bus device is configured to the computer, the automatic testing system could determine the timing of performing an automatic testing procedure on the universal serial bus device.

15 Claims, 2 Drawing Sheets

AUTOMATIC TESTING SYSTEM AND METHOD FOR JUDGING WHETHER UNIVERSAL SERIAL BUS DEVICE IS CONFIGURED TO COMPUTER

FIELD OF THE INVENTION

The present invention relates to an automatic testing system, and more particularly to an automatic testing system for automatically testing a universal serial bus device.

BACKGROUND OF THE INVENTION

USB (Universal Serial Bus) is a specification to establish communication between a device and a host controller. Since the USB has plug-and-play capability, USB devices have been used in many applications. The common USB devices are for example USB video players, USB storage devices, USB mice, USB keyboards, and the like. During or after a USB device is fabricated, a testing procedure is usually performed to assure normal functions of the USB device.

Take a USB keyboard for example. According to a simple testing procedure, the USB keyboard is firstly connected with a computer. Then, all keys of the USB keyboard are manually and successively depressed by the tester. After the keys are depressed, the functions corresponding respective keys are observed to judge whether any defects are present. The manual testing procedure is time-consuming and labor-intensive. In addition, since too many keys need to be manually tested, the tester is readily suffered from fatigue after a long testing time period. Under this circumstance, the possibility of erroneously depressing the keys is increased. For solving these problems, a commercially available automatic keyboard testing device for testing keyboard is disclosed in for example Taiwanese Patent Publication No. 00325905. The operating principles of this patent are known in the art, and are not redundantly described herein.

Before the USB device is tested, the USB device needs to be connected with a computer or a testing device. During the process of connecting the USB device with the computer or the testing device, a message indicating a device change is generated. At the same time, USB protocol descriptions are transmitted from the USB device to the computer. By reading the USB protocol descriptions, the computer may identify the function of the USB device. The USB protocol descriptions are also referred as descriptors. A USB device has several descriptors, including a device descriptor, a configuration descriptor, an interface descriptor, an endpoint descriptor, and the like. Another USB device further includes a string descriptor, a class descriptor and a report descriptor. According to the practical requirement of the USB device, the number of descriptors is increased or decreased. After the descriptors are received by the computer, the descriptors of the USB device are stored in a device registry. From now on, after the USB device is connected with the computer again, the USB device will be detected by the computer. Via the device registry, the USB device is identified by the computer in order to enable the configuration of the USB device.

For example, the computer of the testing device is operated under a Microsoft Windows operating system. When the USB device is connected with the computer (or the testing device) to transmit the descriptors, all USB ports of the computer will be detected by the Microsoft Windows operating system. Under this circumstance, the descriptors of the USB device are repeatedly detected by the computer. After the procedure of detecting all USB ports of the computer is completed, the procedure of enabling configuration of the USB device is done and then the procedure of automatically testing the USB device is performed. Although the computer is able to detect all USB ports, the computer fails to judge whether the configuration of the USB device is enabled. In other words, the computer fails to determine the timing of performing the automatic testing procedure. It is necessary to judge whether the USB device is configured to the computer by manpower. After the USB device is configured, the automatic testing device is activated to perform the automatic testing procedure. Since the manpower is indispensable, the conventional automatic testing procedure is ineffective.

SUMMARY OF THE INVENTION

It is an object of the present invention provides an automatic testing system for determining the timing of performing an automatic testing procedure on a USB device.

Another object of the present invention provides a method for judging whether a universal serial bus device is configured to a computer, so that the automatic testing system is able to determine the timing of performing an automatic testing procedure on a USB device.

In accordance with an aspect of the present invention, there is provided an automatic testing system for automatically testing a universal serial bus device. The automatic testing system includes a computer, a testing device, a connecting management program and an automatic testing program. The testing device is connected to the computer and the universal serial bus device for testing the universal serial bus device. When the universal serial bus device is connected with the testing device, plural descriptors are transmitted from the universal serial bus device to the computer. The connecting management program is installed in the computer for judging whether a target descriptor of the plural descriptors is transmitted to the computer. After the target descriptor is transmitted to the computer and the connecting management program detects that the target descriptor is transmitted to the computer again within a waiting time, the waiting time is zeroed and recounted by the connecting management program. Whereas, after the target descriptor is transmitted to the computer and the connecting management program does not detect that the target descriptor is transmitted to the computer again within the waiting time, an enabling signal is generated. The automatic testing program is installed in the computer for enabling the testing device according to the enabling signal, thereby automatically testing the universal serial bus device.

In an embodiment of the automatic testing system, the connecting management program further comprises a timer for counting the waiting time.

In an embodiment of the automatic testing system, after the waiting time is recounted by the connecting management program and the connecting management program detects that the target descriptor is transmitted to the computer again within the recounted waiting time, the waiting time is zeroed and recounted by the connecting management program again. Whereas, after the target descriptor is transmitted to the computer again and the connecting management program does not detect that the target descriptor is transmitted to the computer within the recounted waiting time, the enabling signal is generated In an embodiment of the automatic testing system, the target descriptor is a device descriptor.

In an embodiment of the automatic testing system, the device descriptor includes a product ID (PID) and a vendor ID (VID).

In an embodiment of the automatic testing system, the target descriptor includes a device descriptor, an interface descriptor and a report descriptor.

In an embodiment of the automatic testing system, the device descriptor further includes a product ID (PID) and a vendor ID (VID).

In an embodiment of the automatic testing system, the universal serial bus device is a USB mouse or a USB keyboard.

In accordance with another aspect of the present invention, there is provided a method for judging whether a universal serial bus device is configured to a computer. The method includes steps of receiving plural descriptors generated from the universal serial bus device, and judging whether a target descriptor of the plural descriptors is received. After the target descriptor is received and the target descriptor is received again within a waiting time, the waiting time is zeroed and recounted. Whereas, after the target descriptor is received and the target descriptor is not received again within the waiting time, the universal serial bus device is determined to be configured to the computer.

In an embodiment of the method, after the waiting time is recounted and the target descriptor is received again within the recounted waiting time, the waiting time is zeroed and recounted again. Whereas, once the target descriptor is not received within the recounted waiting time, the universal serial bus device is determined to be configured to the computer In an embodiment of the method, the target descriptor is a device descriptor.

In an embodiment of the method, the device descriptor includes a product ID (PID) and a vendor ID (VID).

In an embodiment of the method, the target descriptor includes a device descriptor, an interface descriptor and a report descriptor.

In an embodiment of the method, the device descriptor further includes a product ID (PID) and a vendor ID (VID).

In an embodiment of the method, the universal serial bus device is a USB mouse or a USB keyboard.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For allowing the computer to realize the timing of initiating the automatic testing procedure, the present invention provides a method for judging whether a USB device is configured to the computer.

Figure 1:
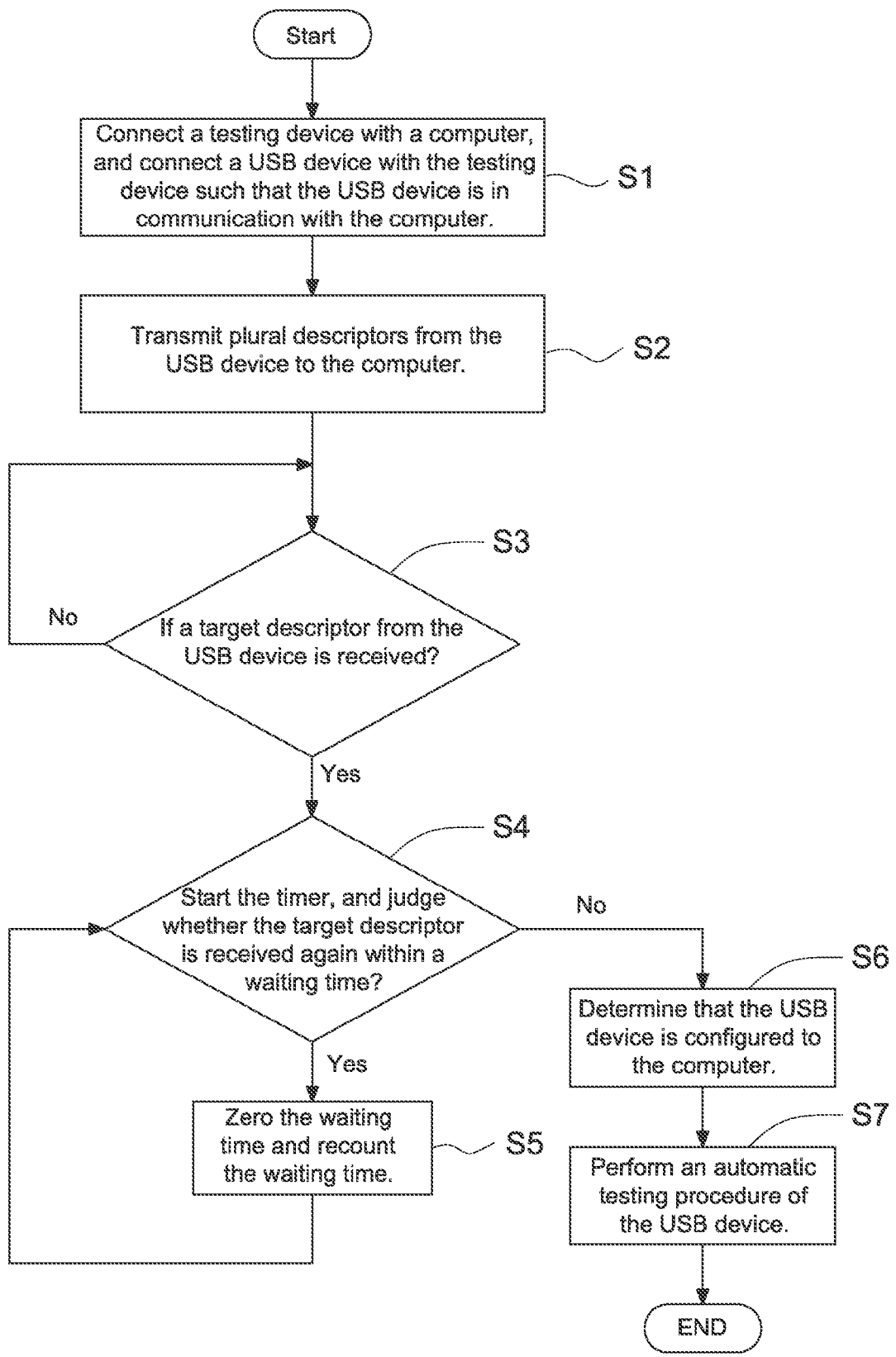
FIG. 1 is a flowchart illustrating a method for judging whether a USB device is configured to a computer according to an embodiment of the present invention.

FIG. 1 is a flowchart illustrating a method for judging whether a USB device is configured to a computer according to an embodiment of the present invention. In the step S1, a testing device is connected with a computer, and a USB device is connected with the testing device such that the USB device is in communication with the computer. In the step S2, plural descriptors are transmitted from the USB device to the computer. In the step S3, the method judges whether a target descriptor from the USB device is received. In the step S4, a timer is started, and method judges whether the target descriptor is received again within a waiting time. In the step S5, the waiting time is zeroed and the waiting time is recounted. In the step S6, it is determined that the USB device is configured to the computer. In the step S7, an automatic testing procedure of the USB device is performed.

In addition, once the target descriptor from the USB device is not received in the step S3, the step S3 will be repeatedly done. Whereas, once the target descriptor from the USB device is received in the step S3, the step S4 is done. Once the target descriptor is received again within the waiting time in the step S4, the step S5 is done. Whereas, once the target descriptor is not received again within the waiting time, the step S6 is done. After the step S5 is done, the step S4 will be performed.

Figure 2:
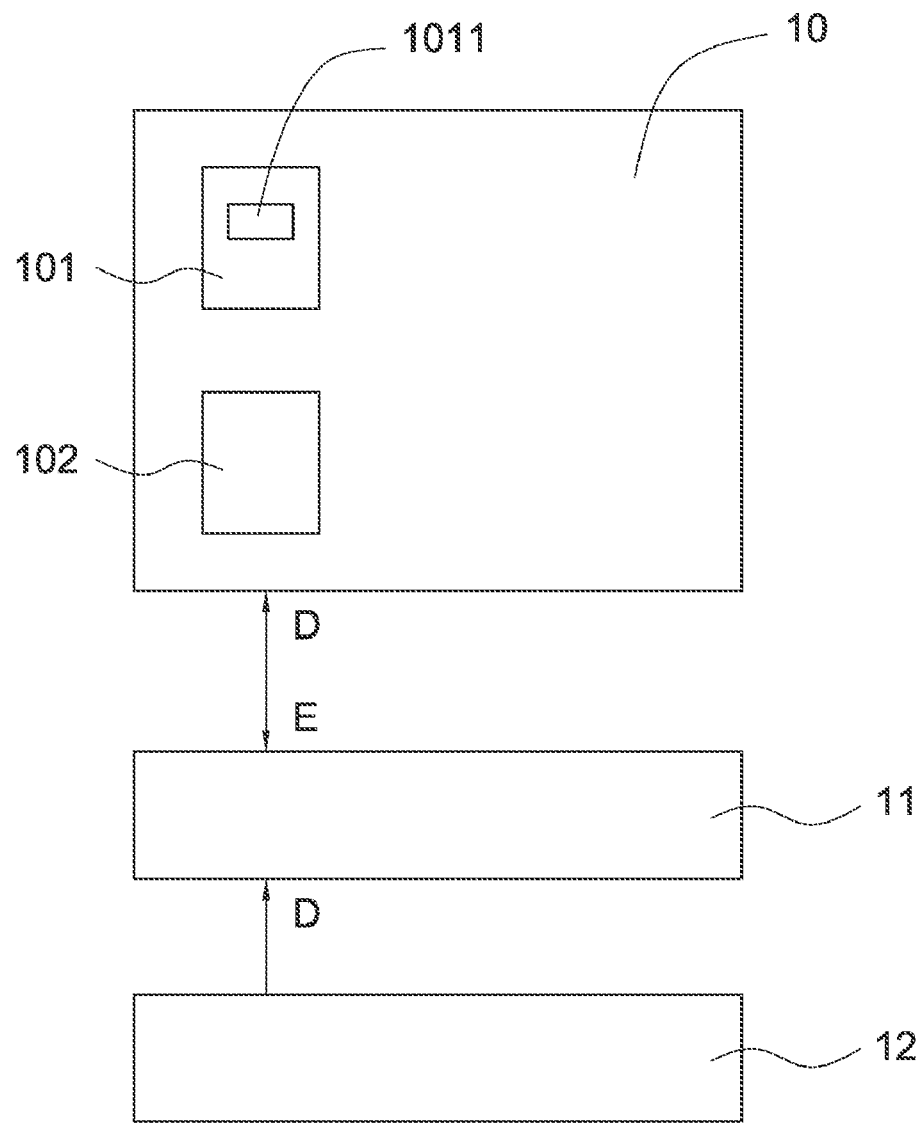
FIG. 2 is a schematic block diagram illustrating an automatic testing system according to an embodiment of the present invention.

Hereinafter, the method for judging whether the USB device is configured to the computer will be illustrated in more details with reference to an automatic testing system. FIG. 2 is a schematic block diagram illustrating an automatic testing system according to an embodiment of the present invention. As shown in FIG. 2, the automatic testing system 1 is used for automatically testing a USB device 12. The automatic testing system 1 comprises a computer 10 and a testing device 11. The testing device 11 is connected to the computer 10 and the USB device 12 for testing the USB device 12. The structures and operating principles of the testing device 11 are similar to those illustrated in Taiwanese Patent Publication No. 00325905, and are not redundantly described herein.

Furthermore, the computer 10 has a connecting management program 101 and an automatic testing program 102 for executing automatic testing program procedure. The connecting management program 101 has a timer 1011. The USB device 12 has a USB interface to be connected. In this embodiment, the USB device 12 is a USB keyboard.

As previously described in the prior art, after the USB keyboard 12 is connected to the computer 10 or the testing device 11, plural descriptors D will be transmitted from the USB keyboard 12 to the computer 10. By reading the plural descriptors D, the computer 10 may identify the function of the USB keyboard 12. The plural descriptors D are stored in a registry editor of the computer 10. For assuring that the USB keyboard 12 is configured to the computer 10, the last one of the plural descriptors D is defined as a target descriptor. According to the target descriptor, the method of the present invention may judge whether the USB keyboard 12 is configured to the computer 10. Moreover, the connecting management program 101 is employed to judge whether the target descriptor of the plural descriptors D is transmitted to the computer 10.

In this embodiment, the target descriptor is a device descriptor, which includes a product ID (PID) and a vendor ID (VID). Alternatively, the target descriptor includes a device descriptor, an interface descriptor and a report descriptor. In a preferred embodiment, the target descriptor includes a device descriptor, an interface descriptor and a report descriptor, and the target descriptor is stored in the registry editor of the Windows operating system of the computer. For example, the target descriptor has a format of Vid__1234Pid__5678MI__05Col__09.

When the automatic testing system 1 is activated, the testing device 11 is connected with the computer 10 and the USB keyboard 12 is connected with the testing device 11, so that the USB keyboard 12 is in communication with the computer 10 (see step S1). Then, plural descriptors D are transmitted from the USB keyboard 12 to the computer 10 (see step s2).

Then, the connecting management program 101 of the computer will judge whether a target descriptor from the USB keyboard 12 is received (see step S3). Once the connecting management program 101 detects that no target descriptor is received by the computer 10, the step of receiving the target descriptor will be continuously performed until the target descriptor is received. Once the connecting management program 101 detects that a target descriptor is received by the computer 10, the timer 1011 is started and the connecting management program 101 judges whether the target descriptor is received again by the computer 10 within a waiting time (see step S4).

In the step S4, once the connecting management program 101 detects that the target descriptor is received by the computer 10 again within the waiting time, the waiting time is zeroed and the waiting time is recounted (see step S5) and the step S4 is repeatedly performed. Once the connecting management program 101 detects that the target descriptor is not received by the computer 10 again within the waiting time, the USB keyboard 12 is determined to be configured to the computer 10 (see step S6) and an enabling signal E is generated. According to the enabling signal E, the testing device 11 is enabled by the automatic testing program 102, and thus the USB keyboard 12 is tested by the testing device 11 (see step S7). The operating principles of the automatic testing procedure are not redundantly described herein.

In the above embodiments, the waiting time is counted by the timer 1011. According to the waiting time, the automatic testing system detects whether the descriptors D are repeatedly transmitted. In this context, the target descriptor may indicate all of the descriptors D. Once the automatic testing system detects that the target descriptor is transmitted within the waiting time, it is meant that the USB ports have not been completely detected by the computer 10. On the other hand, once the target descriptor is not received within the waiting time, it is meant that the USB keyboard 12 is configured to the computer 10 and the further automatic testing procedure could be performed. It is important to determine the waiting time. If the waiting time is too short, the target descriptor that should be detected will be neglected. That is, the connecting management program 101 will be possibly subject to erroneous judgment. Under this circumstance, the further automatic testing procedure fails to be successfully performed. Depending to the types of USB devices, the waiting time is variable. By undue experiments, the proper waiting time is determined.

From the above description, the present invention provides an automatic testing system and a method for judging whether a universal serial bus device is configured to a computer. Once the connecting management program detects that the target descriptor is not received by the computer again within the waiting time, the USB device is determined to be configured to the computer. After the USB device is configured to the computer, the automatic testing procedure will be performed. Since the automatic testing system and the judging method of the present invention are capable of automatically implemented, the present invention is more efficient and labor-saving.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic testing system for automatically testing a universal serial bus device, said automatic testing system comprising:
    a computer;
    a testing device connected to said computer and said universal serial bus device for testing said universal serial bus device, wherein when said universal serial bus device is connected with said testing device, plural descriptors are transmitted from said universal serial bus device to said computer;
    a connecting management program installed in said computer for judging whether a target descriptor of said plural descriptors is transmitted to said computer, wherein after said target descriptor is transmitted to said computer and said connecting management program detects that said target descriptor is transmitted to said computer again within a waiting time, said waiting time is zeroed and recounted by said connecting management program, and wherein after said target descriptor is transmitted to said computer and said connecting management program does not detect that said target descriptor is transmitted to said computer again within said waiting time, an enabling signal is generated; and
    an automatic testing program installed in said computer for enabling said testing device according to said enabling signal, thereby automatically testing said universal serial bus device.

2. The automatic testing system according to claim 1 wherein said connecting management program further comprises a timer for counting said waiting time.

3. The automatic testing system according to claim 1 wherein after said waiting time is recounted by said connecting management program and said connecting management program detects that said target descriptor is transmitted to said computer again within said recounted waiting time, said waiting time is zeroed and recounted by said connecting management program again, and wherein after said target descriptor is transmitted to said computer again and said connecting management program does not detect that said target descriptor is transmitted to said computer within said recounted waiting time, said enabling signal is generated.

4. The automatic testing system according to claim 1 wherein said target descriptor is a device descriptor.

5. The automatic testing system according to claim 4 wherein said device descriptor includes a product ID (PID) and a vendor ID (VID).

6. The automatic testing system according to claim 1 wherein said target descriptor includes a device descriptor, an interface descriptor and a report descriptor.

7. The automatic testing system according to claim 6 wherein said device descriptor further includes a product ID (PID) and a vendor ID (VID).

8. The automatic testing system according to claim 1 wherein said universal serial bus device is a USB mouse or a USB keyboard.

9. A method for judging whether a universal serial bus device is configured to a computer, said method comprising steps of:
    receiving plural descriptors generated from said universal serial bus device; and
    judging whether a target descriptor of said plural descriptors is received, wherein after said target descriptor is received and said target descriptor is received again within a waiting time, said waiting time is zeroed and recounted, and wherein after said target descriptor is received and said target descriptor is not received again within said waiting time, said universal serial bus device is determined to be configured to said computer.

10. The method according to claim 9 wherein after said waiting time is recounted and said target descriptor is received again within said recounted waiting time, said waiting time is zeroed and recounted again, and wherein once said target descriptor is not received within said recounted waiting time, said universal serial bus device is determined to be configured to said computer.

11. The method according to claim 10 wherein said target descriptor is a device descriptor.

12. The method according to claim 11 wherein said device descriptor includes a product ID (PID) and a vendor ID (VID).

13. The method according to claim 9 wherein said target descriptor includes a device descriptor, an interface descriptor and a report descriptor.

14. The method according to claim 13 wherein said device descriptor further includes a product ID (PID) and a vendor ID (VID).

15. The method according to claim 9 wherein said universal serial bus device is a USB mouse or a USB keyboard.

* * * * *